United States Patent [19]

Kuromatsu

[11] Patent Number: 4,490,158
[45] Date of Patent: Dec. 25, 1984

[54] GRINDING WHEEL FOR ELECTROLYTIC AND MECHANICAL GRINDING

[75] Inventor: Akio Kuromatsu, Yokohama, Japan

[73] Assignees: Ohyo Jiki Lab. Co., Tokyo; Nicco Machine Tool Company, Ltd., Kanagawa, both of Japan

[21] Appl. No.: 513,960

[22] Filed: Jul. 15, 1983

Related U.S. Application Data

[62] Division of Ser. No. 373,720, Apr. 30, 1982.

[30] Foreign Application Priority Data

May 21, 1981 [JP] Japan ................................. 56-75690

[51] Int. Cl.³ .............................................. B24D 3/00
[52] U.S. Cl. ........................................ 51/293; 51/295; 51/309; 204/129.46
[58] Field of Search .................... 51/293, 295, 309; 204/129.46

[56] References Cited

U.S. PATENT DOCUMENTS

| 3,194,751 | 7/1965 | Brady | 204/224 |
| 3,510,994 | 5/1970 | Amero et al. | 51/295 |
| 3,960,516 | 6/1976 | Biardi | 51/293 |

FOREIGN PATENT DOCUMENTS 57-107778 7/1982 Japan.
808233 3/1981 U.S.S.R.

Primary Examiner—Paul Lieberman
Assistant Examiner—W. Thompson
Attorney, Agent, or Firm—Armstrong, Nikaido, Marmelstein & Kubovcik

[57] ABSTRACT

A grinding wheel having a circumferential rim and a plurality of electrically conductive zone and non-grinding zones therebetween the rim. A method of using such a grindstone as disclosed. Further, certain alternative methods of making such a grindstone are disclosed.

17 Claims, 13 Drawing Figures

GRINDING WHEEL FOR ELECTROLYTIC AND MECHANICAL GRINDING

This is a division of application Ser. No. 373,720, filed Apr. 30, 1982.

The present invention relates to grinding wheels and, more specifically, to a grinding wheel which grinds an object through both a combined mechanical and electrochemical process.

BACKGROUND OF THE INVENTION

Two different processes for grinding and wheels therefor are known in the art. For precise grinding on metal, ceramic and other materials, a mechanical grinding method with grindstones made of particles of green carborundum, white alundum, diamond, boron nitride and the like is widely used. This mechanical method, however, has some shortcomings. They are:

1. A low grinding speed is required.
2. It is almost impossible to grind ultra hard alloy, hardened steel by quenching, sendust alloy and rare earth compound.
3. The strain created during the process may cause deformation of the work.
4. The grindstone wears down quickly.

For grinding hard-to-process materials, the electrolytic method, in which a grindstone made solely of graphite works as an electrode, has been in use for some time. With the help of a proper electroconductive grinding lubricant, this method allows electricity to pass from the grindstone made of graphite to the material to be ground. This electrochemically erodes and dissolves the material. With this method, the ability to process a certain material depends on the material's electric and electro-chemical properties, and not on its mechanical properties. Thus, with this grinding wheel, it is possible to grind a material which is almost impossible to grind using strictly the mechanical method. Yet, there are some disadvantages which are as follows:

1. Because the electroconductive grinding lubricant prevents direct contact between the grindstone and the work, it is hard to get smooth and precise results.
2. In order to get a high degree of accuracy, finish grinding has to be done using the mechanical method.
3. Therefore, the rapid grinding speed, which is an advantage of the electrolytic method, cannot be fully realized.

A grindstone made of porous green carborundum having electroless copper plating applied thereto, making it electrically conductive, has also been in use. This prior art grindstone is made by pressure impregnating a copper aqueous solution into the porous green carborundum. With this grindstone, mechanical and electrolytic grinding can be performed at the same time. But, this method also has its shortcomings, which are as follows:

1. Because the electrical conductivity may vary with the passage of time, it is hard to maintain the optimum electrolytic condition during grinding.
2. Because the porous grindstone is made by impregnating plating fluid into the grindstone, the grindstone itself is brittle and wears down easily.
3. It is not easy to make a grindstone of this type without chips and cracks. It is especially hard to make a thin blade grindstone of this kind.
4. With this method alone, an exact and smooth finish is not attainable.
5. Since mechanical grinding is required for the finishing, pressure from the grindstone may cause the deformation of the work during or after the grinding process.

The present invention aims at overcoming the aforementioned shortcomings. It does so by a new, efficient, and durable grinding wheel which will not easily wear down or crack, and which will not cause deformation of the work. It can also attain a higher degree of accuracy and a superior finish without additional mechanical grinding.

The grinding wheel of the present invention has a circumferential rim and a plurality of electrically conductive zones and non-conductive grinding zones therebetween around the rim.

The wheel can comprise an annular electro-conductive tube, an annular grindstone radially surrounding the tube, a plurality of axial grooves filled with an electro-conductive material on the rim of the grindstone, and connector means extending radially from the tube to the filled axial grooves for electrically connecting the grooves with the tube. The filled axial grooves are the conductive zones and the portions of the grindstone therebetween are the grinding zones.

The connector means can comprise side grooves on the sides of the grindstone filled with an electro-conductive material The conductor means alternatively can comprise an annular electroconductive disk imbedded in the grindstone extending from the tube to the axial grooves. The axial grooves can be parallel to the axis of the grindstone and the side grooves can follow the radii of the grindstone. Alternatively, the axial grooves can be offset-angled at an acute angle from the axis and the side grooves can be offset-angled at an acute angle from the radii of the grindstone.

The wheel can further comprise a pair of annular, electro-conductive disks concentrically mounted on opposite sides of the grindstone electrically connected to the tube and the side grooves.

The wheel can comprise an annular electro-conductive tube and an annular grindstone radially surrounding the tube having selective sector-shaped portions impregnated with an electro-conductive material. These impregnated portions are the conductive zones and the portions therebetween are the grinding zones.

Alternatively, the wheel can comprise an annular electro-conductive tube, a grindstone treated so as to be electro-conductive radially surrounding the tube, and a plurality of axial grooves on the rim of the grindstone filled with an insulating material. The filled axial grooves are the grinding zones and that portions of the grindstone therebetween are the conductive zones.

The wheel can comprise an annular wheel of a conductive substance having an outer circumference, a plurality of electroconductive grindstone segments curved to fit and mounted on the circumference with radially extending gaps between adjacent segments, and insulating material filling the gaps. In this embodiment, the insulating material filling the gaps are the grinding zones and the segments are the conductive zones.

The wheel can comprise an annular wheel of electro-conductive substance having an outer circumference and a plurality of radially extending teeth and a plurality of grindstone segments curved to fit and mounted on the circumference between the teeth. The adjacent segments are separated from one another by the teeth. In this embodiment, the teeth are the conductive zones and the segments are the grinding zones.

The wheel can comprise an annular electroconductive tube and an annular grindstone radially surrounding the tube having a circumference and a plurality of radial grooves extending from the tube to the circumference. The grooves can be filled with an electroconductive material. The portions of the filled grooves in this embodiment on the circumference are the conductive zones and the portions of the grindstone surrounding the grooves on the circumference are the grinding zones.

The wheel can also comprise an annular conductive tube and an annular electroconductively treated grindstone having a circumference and a plurality of radial grooves extending from the tube to the circumference. The grooves can be filled with an insulating material. In this embodiment, the portions of the filled grooves on the circumference are the grinding zones and the portions of the electroconductively treated grindstones surrounding the grooves on the circumference are the conductive zones.

The grooves in the above-two-mentioned embodiments can be formed on both sides of the grindstone and can be rectangular in cross-section. The grooves could also be triangular in crosssection. Alternatively, the grindstone has opposed faces and a center portion therebetween with the grooves formed in the center portion extending to the circumference.

The present invention also comprises a method of grinding a workpiece comprising mounting a grinding wheel having a circumferential rim and a plurality of electrically conductive zones and non-conductive grinding zones therebetween around the rim on a grinding machine, applying electricity to the conductive zones, and simultaneously spinning the wheel and spraying an electrolytic fluid on the wheel while applying the workpiece to the wheel. Alternatively, the wheel can be applied to the workpiece.

The present invention also includes a method of manufacturing a grinding wheel comprising forming an annular grindstone of abrasive particles having opposed side, a circumferential rim, and a center aperture, fitting an annular conductive tube into the aperture, and making a plurality of alternating electrically conductive zones and non-conductive grinding zones around the rim with the conductive zones being electrically connected to the tube.

The above step of making can comprise cutting a plurality of axial grooves in the rim, filling the axial grooves with an electroconductive material, and connecting the filled axial grooves to the tube. The connecting can be accomplished by cutting a plurality of radial side grooves from the tube to the axial grooves and filling these radial grooves with an electro-conductive material. The connecting can also comprise imbedding a pair of annular electroconductive disks into the opposed sides with the disks extending radially from the tube to the axial grooves. The step of connecting could also comprise dividing the grindstone radially into two halves, and inserting an annular electroconductive disk between the halves extending from the tube to the axial grooves.

In another embodiment, the making can comprise treating a plurality of sector-shaped zones of the grindstone to make the same electroconductive with the sector-shaped zones extending to meet the tube. This treating can comprise masking selected portions of the opposed sides and the rim leaving there the desired sector-shaped zones, placing the masked grindstone into a vacuum chamber dividing the chamber into two portions, placing an aqueous solution of the electroconductive material into one of the portions, drawing a vacuum in the other portion thereby impregnating the aqueous solution into the sector-shaped zone, drying the selectively impregnated grindstone, and stripping the masking from it.

The step of making in another embodiment can comprise treating the entire grindstone to make the same electroconductive, cutting a plurality of axial grooves in the rim of the grindstone and filling the grooves with an insulating material.

The step of making could also comprise dividing the grindstone into a plurality of curved segments, treating the segments to make the same electroconductive, mounting the segments onto the tube with gaps between adjacent segments, and filling the gaps with an insulating material. Further, the step of making can comprise forming a plurality of radial grooves in the grindstone from the tube to the rim, and filling the grooves with either an electroconductive material or an insulating material. In the case where the grooves are filled with an insulating material, the grindstone is previously treated to make the same electroconductive. The grooves can be cut into either both opposed sides or can be formed in a center portion between the opposed sides.

A further method of making a grinding wheel can comprise forming a wheel of electroconductive substance having a circumferential rim and a plurality of radially extending teeth, forming a plurality of grindstone segments of abrasive particles which are curved to fit the rim, and mounting the segments of abrasive particles which are curved to fit the rim, and mounting the segments onto the rim with each segment being separated from adjacent segments by one of the teeth.

The abrasive particles that these grindstones can be made of can be selected from the group consisting of green carborundum, white alundum, diamond, boron nitride, boron carbide, tungsten carbide, titanium carbide, titanium nitride, tantillum carbide, and niobium carbide. Other suitable materials would be readily apparent to those having ordinary skill in the art.

DETAILED DESCRIPTION OF PREFERRED EMBODIMENTS

A grinding wheel, which is obtainable in the market, is made by pressing the particles of green carborundum, white alundum, pink alundum, silica and the like with the upper bonding agent and heat. Particles other than these can be used for the wheel if they are not easily worn down and are good in insulation.

Figure 1:
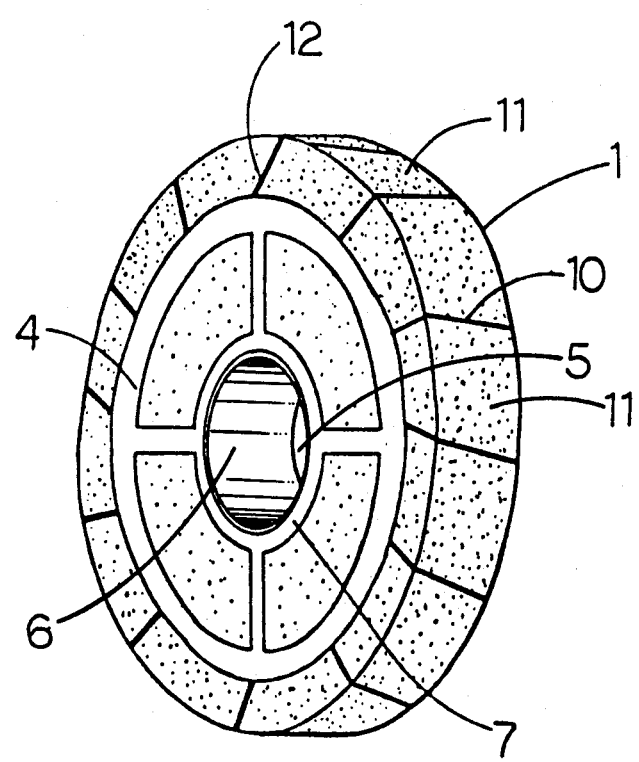
FIG. 1 is a perspective view of a first embodiment of the present invention.
Figure 2:
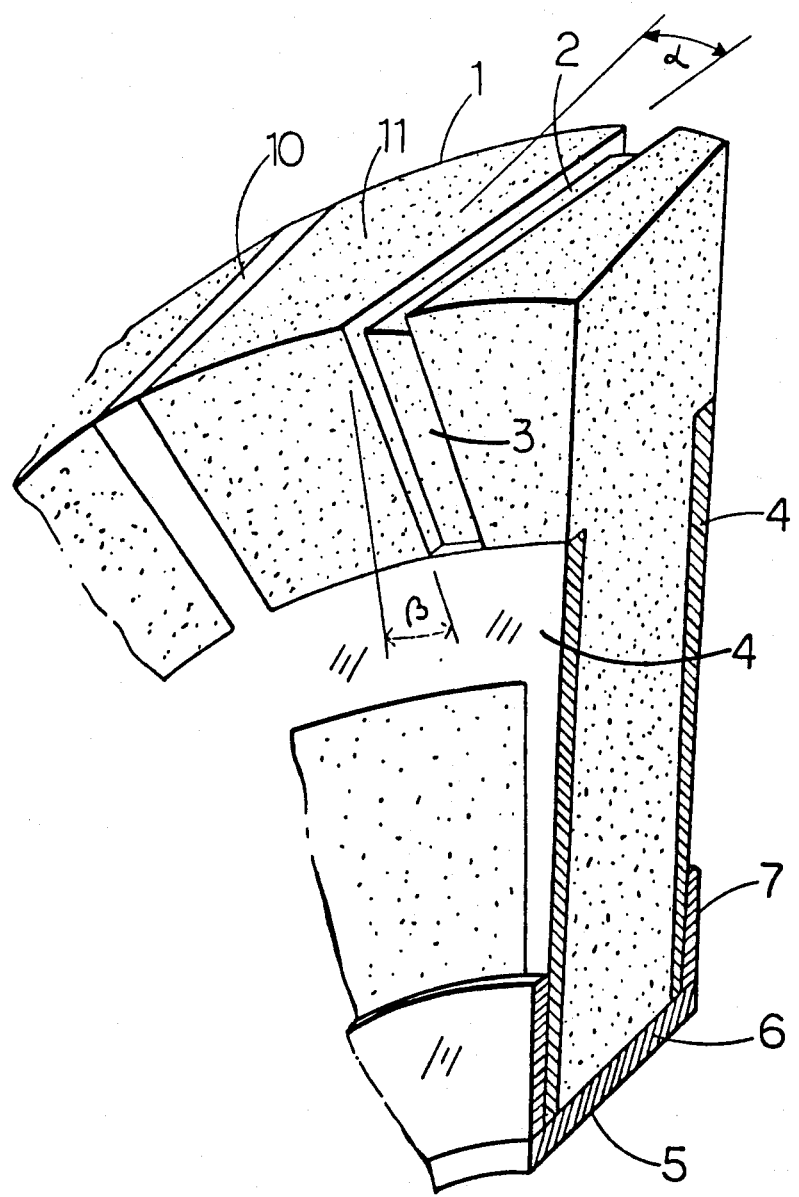
FIG. 2 is an enlarged cut away view of the wheel of FIG. 1.

As can be seen in FIGS. 1 and 2, one or more grooves are made across the rim of the wheel. They are parallel to the shaft or at an angle of $\alpha$ to the shaft, and are at equal or unequal intervals on the rim.

On the side of the wheel, side grooves[3] are made or cut connected to the rim grooves[2]. One end of each side groove[3] is connected to the rim groove, the other end of the side groove reaches to an electro disk[4] made of metal which is formed and inserted at the center of the side surface of the wheel. The direction of the side groove[3] can be the same as that of the radius of the wheel or at an angle of $\beta$ to the radius. It is possible to make the rim grooves[2] deep enough to reach to the electro disk[4]. In that case, the rim grooves[2] serve as the side grooves[3] as well.

A hole[5] for the shaft is made at the center of the wheel, and an electro tube[6]. The electro disk[4] and tube[6] can be formed by applying electroconductive past or paint such as silver or copper mixed with a resin, by coating with metal leaf, or by using such methods as follows: vacuum evaporation, sputtering, dry plating (CVD, PVD, etc.), non-electrolytic plating, metal spraying or printing.

A doughnut shaped or annular electro-collector[7] is made at the center of the wheel's side surface.

Both the rim grooves[2] and the side grooves[3] are filled with electro-conductive materials. This makes them electroconductive zones[10], and paths[12]. For electroconductive materials, hardened substances made of powdered metals such as Ag, Cu, Ni and the like, or hardened substances made of powdered alloys based on these metals and adhesive resins such as phenol, epoxy, adarlite and the like can be used. In addition to these, it is useful to add particles of non-metal compounds such as diamond, carborumdum, silica, boron nitride, boron carbide and the like, or cemented substances such as alumina, tungsten carbide, titanium carbide, titanium nitride, tantalum carbide, nibium carbide and the like, or lubricating substances such as graphite, carbon, molybdenum disulfide and the like, or a mix of these. But in certain circumstances, fragments of metals such as Ag, Cu, Ni and the like, or alloys based on these metals, or super alloys, or a cermet can be used.

The surface of the electroconductive path[12] formed on the side of the wheel at an angle of $\beta$ to the radius can be at the same level as the wheel's surface. But, if the path is not at the same level, that is if it is "sunken", this sunken electroconductive path can bring grinding lubricant to the surface of the work and make the grinding of a groove very effective. The rim of the wheel excluding the grooves forms the grinding zone[11].

In this example, electric discharge zones[10] were formed by making the rim grooves[2] and filling them with an electroconductive material such as silver, copper, carbon or the like. However, it is possible to form electroconductive zones not by making rim grooves but by selectively impregnating the rim with electroconductive material. To do so, the axial surfaces of the wheel can be masked by a suitable material, such as synthetic resin, leaving bare the desired electroconductive zone areas. An electroconductive liquid containing the desired electrolyte is then permeated into the zone areas by placing the material above the wheel in a vacuum chamber and pulling a vacuum on the bottom side of the wheel. The liquid evaporates and the electrolyte remains in the desired zone area. The masking is then stripped. In any case, electroconductive zones across the rim of the wheel are necessary on this new type of grinding wheel.

Figure 3:
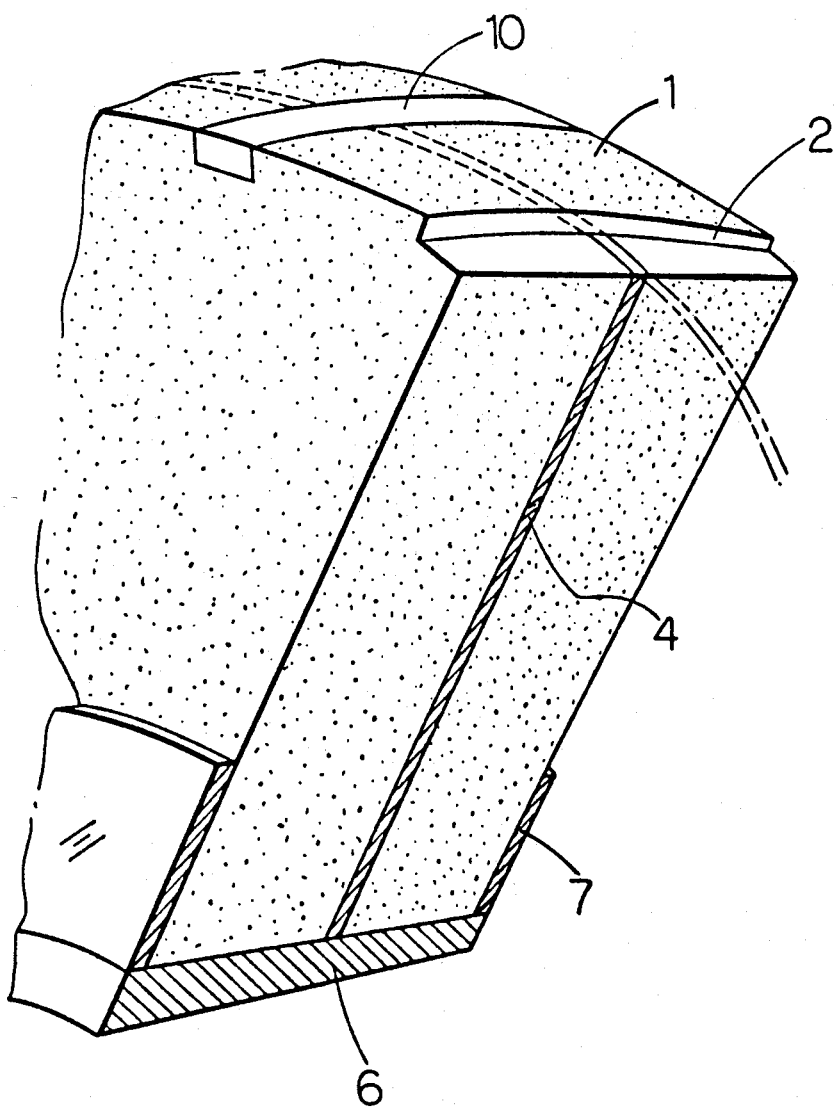
FIG. 3 is an enlarged cut away view of a second embodiment.

In the first embodiment shown in FIGS. 1 and 2, the electroconductive disks[4] are placed only on the side of the wheel, but they can also be placed within the wheel as is shown in FIG. 3. A doughnut type electroconductive disk[4] is made and placed inside the wheel so that its outer circumference touches the bottom of the rim grooves[2] or appears slightly above the bottom of them and so its inner circumference is connected to the tube[6], thus enabling the electricity to flow from the tube[6] to the rim grooves[2].

Figure 4:
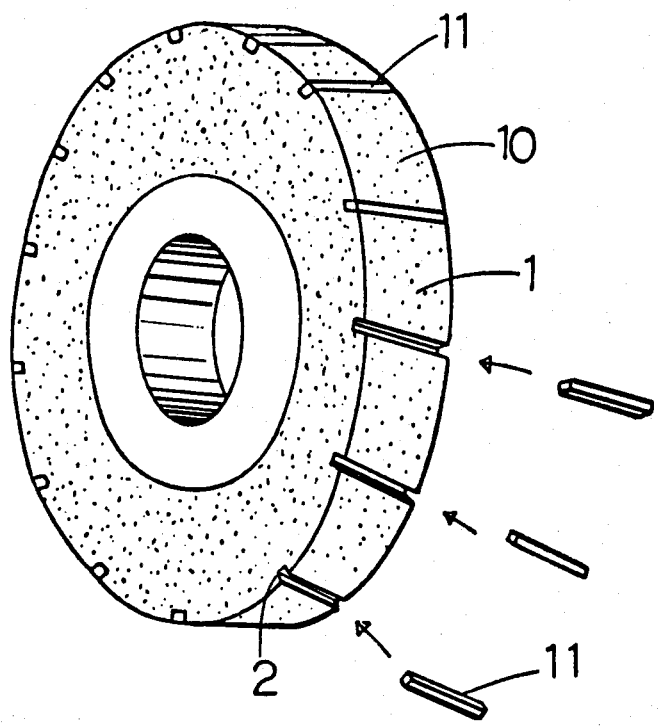
FIG. 4 is a perspective view of a third embodiment.

Though the electroconductive zones have been shown to be on the rim of an insulated wheel thus far, it is possible to have insulated zones on the rim of an electroconductive wheel instead. As can be seen in FIG. 4, a grinding wheel, which is obtainable in a market, made by pressing particles of green carborundum, white alundum, silica and the like with a proper bonding agent and heat is made electroconductive by applying Ag, Ni, Cu, carbon and the like to particular zones. An alternative to this is a grinding wheel made by pressing green carborundum, white alundum and the like, onto which an electroconductive treatment is applied. Silver can be applied to the rim of the wheel using the silver mirror treatment. In applying Ni and Cu, non-electrolytic plating can be used. For carbon, the wheel can be simply impregnated. Any of these processes will make the wheel electroconductive.

Next grooves[2] are made across the rim of the wheel and filled with insulating materials in order to form the grinding zones[11]. For insulated materials, particles of hard oxides or carbide compounds such as green carborundum, white alundum, ceramic, diamond, boron nitride, boron carbide and the like, or cemented substances such as tungsten carbide, titanium carbide, titanium nitride, tantalum carbide, niobium carbide and the like with phenol, epoxy feldspar and the like are mixed and hardened with the help of heat. The grooveless surface of the rim, and not the grooves, forms the conductive zone[10] on the wheel.

In this application example, the grinding zones are formed by making the rim grooves and filling them with insulating materials. But, it is possible to form grinding zones not by making grooves but by skipping impregnation or plating of at least one zone across the rim when the wheel has previously been impregnated or plated for electroconductiveness.

Figure 5:
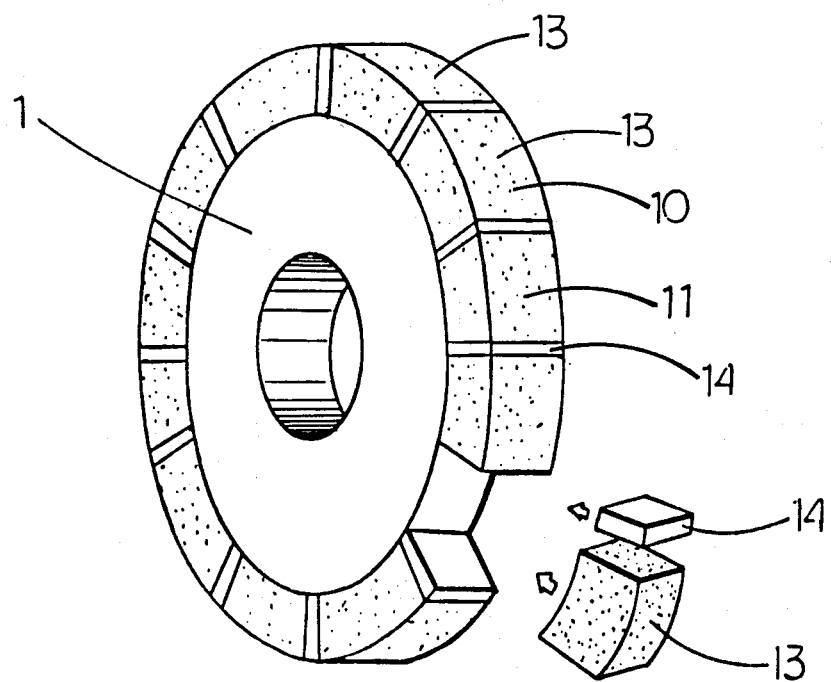
FIG. 5 is a perspective view of a fourth embodiment.

Thus far, the grinding zones and the conductive zones have been formed on the rim of a wheel made of conventional grindstone. However, as shown in FIG. 5, the grinding zones and the conductive zones can be formed on the rim of a wheel made of metal. The center part of the grinding wheel is made of metal and is conductive. On the rim of this main wheel[1] made of metal, several conductive grindstone segments[13] are placed. These grindstone segments[13] are curved so as to fit to the circumference of the main wheel[1]. The gaps between the grindstone segments are filled with insulating materials[14]. These conductive grindstone segments[13]

form the conductive zones[10] and the spaces between them which are filled with insulating materials form the grinding zones[11].

Figure 6:
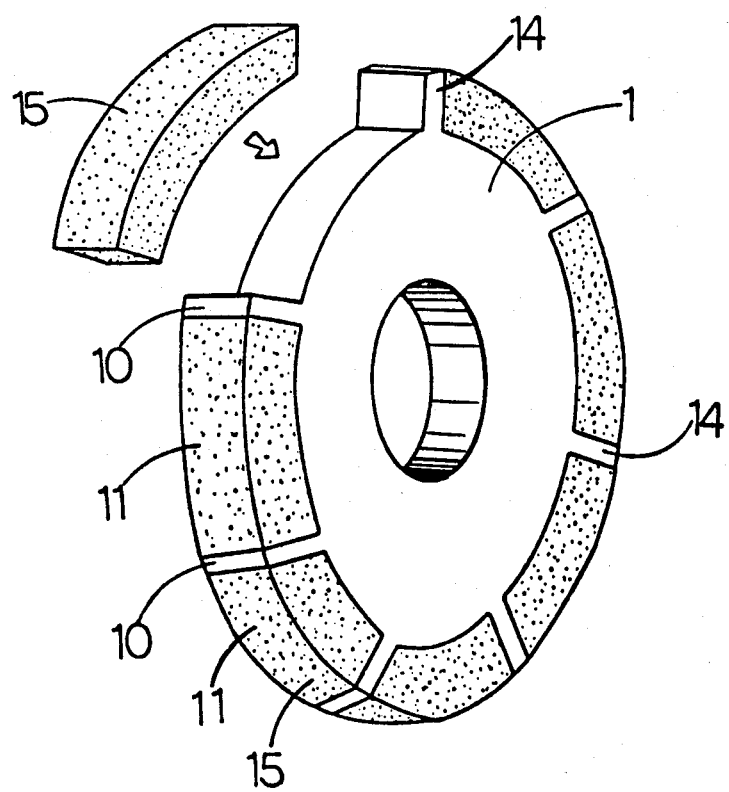
FIG. 6 is a perspective view of a fifth embodiment.

Or, as shown in FIG. 6, when the metal wheel is made, several "tooth-like" protrusions[14] are allowed to remain and these teeth[14] are used as conductive zones[10]. Then, the gaps between the teeth are filled with curved insulating grindstone segments[15], thus forming the grinding zones[11].

Figure 7:
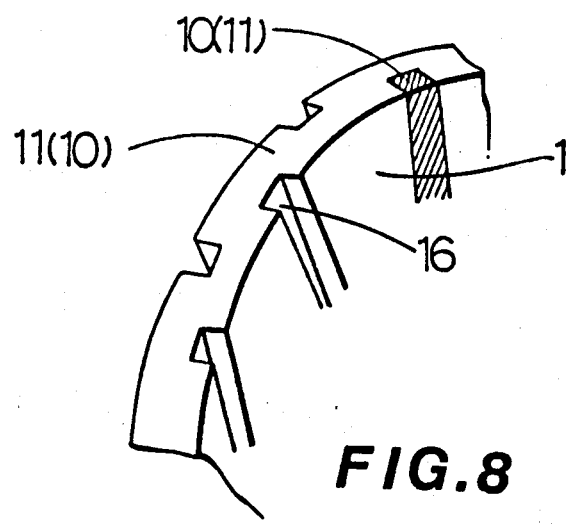
FIG. 7 is a partial, perspective view of a sixth embodiment.
Figure 8:
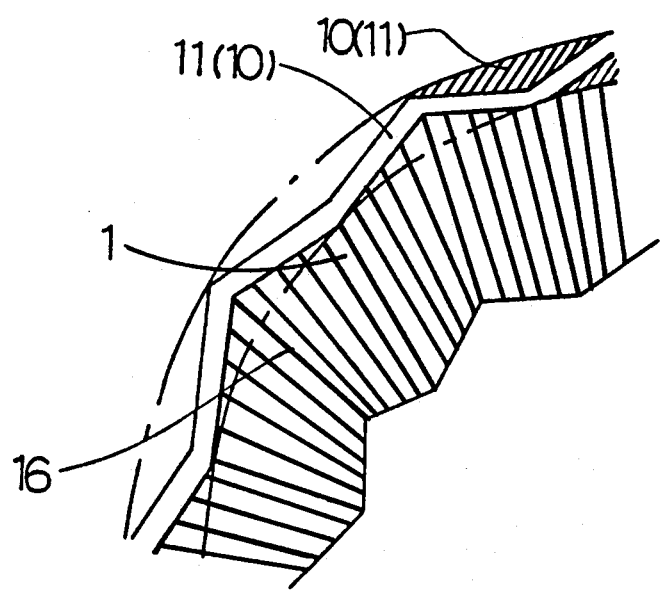
FIG. 8 is a partial, perspective view of a seventh embodiment.

In the above embodiments, the conductive zones and the grinding zones were located on the rim of the wheel. It is also possible to form these zones by making several radial grooves[10] on both sides of a wheel[1] made of either conductive or insulating grindstone and then filling the grooves with either insulating or conductive materials. The grooves can be rectangular as shown in FIG. 7 or triangular as in FIG. 8 and can be formed when pressing the wheel itself.

When the wheel itself is conductive, the grooves are filled with insultating materials, and when it is insulated, the grooves are filled with conductive materials. By using these radial grooves, the conductive and the grinding zones will cover the circumference of the wheel.

Figure 9:
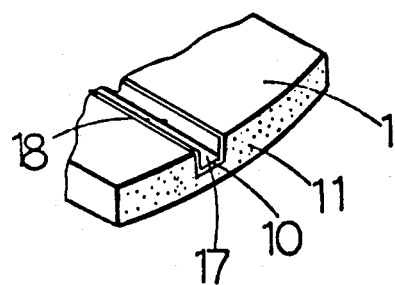
FIG. 9 is a partial, perspective view of an eighth embodiment.

Instead of using conductive grindstone or metal, the radial grooves can be made conductive paths or conductive zones by coating them or injecting into them a liquid made mainly of silver or copper as illustrated in FIG. 9. By coating the grooves[17] with conductive liquid, electricity can flow to the rim of the wheel, as the grooves connect the rim with the collector. The coated grooves[18] on the rim of the wheel serve as the conductive zones[10], while the remaining parts of the rim serve as the grinding stones[11].

Figure 10:
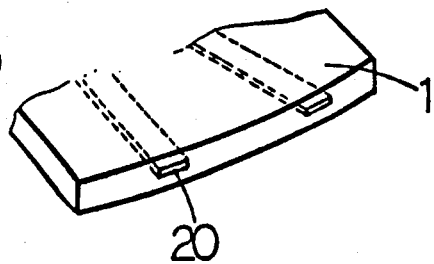
FIG. 10 is a partial, perspective view of a ninth embodiment.
Figure 11:
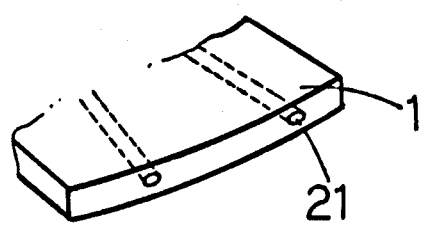
FIG. 11 is a partial, perspective view of a tenth embodiment.

Though electroconductive coating was done in the grooves on the side surfaces of the wheel in the above example, it is possible to form conductive layers or plates within the wheel[1] by inserting several conductive plates[20] or rods[21] into the wheel as shown in FIGS. 10 and 11.

Figure 12:
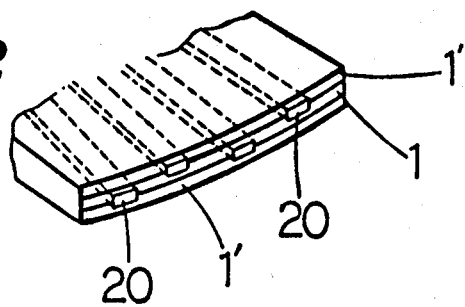
FIG. 12 is a partial, perspective view of an eleventh embodiment.

Another way is to make several radial grooves[20] on a thin wheel[1] and insert into those grooves conductive plates or rods. On top of this wheel, one or more thin wheels[1] can be placed making one wheel with the conductive zones and the grinding zones as shown in FIG. 12.

No new or special materials are necessary in making the wheel, simply well-known materials such as green carbide and the like, which are compressed by using a well-known method. The wheel, therefore, is obtainable at a low cost.

Figure 13:
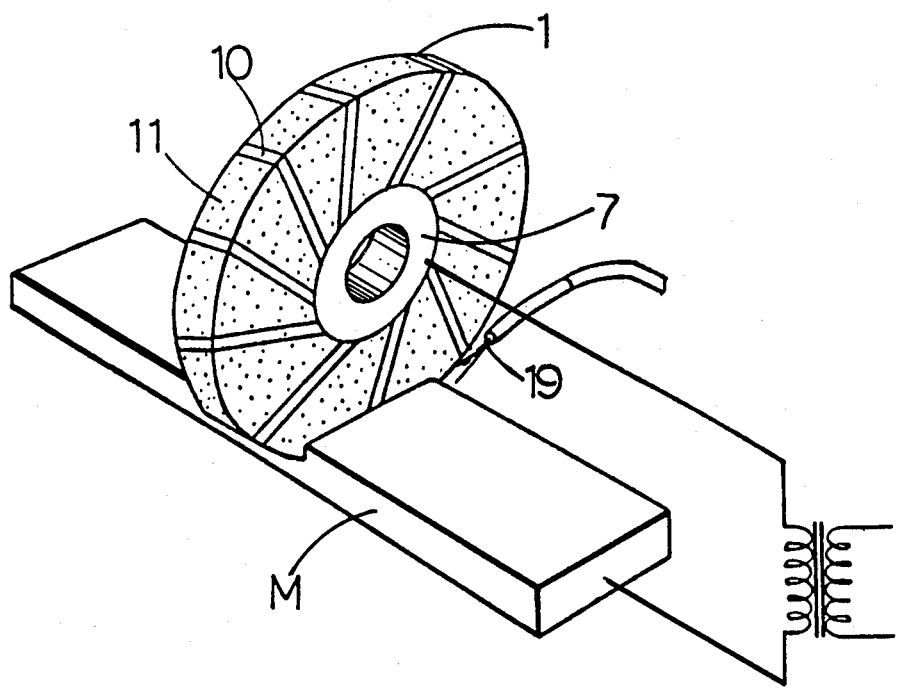
FIG. 13 is a simplified, perspective view of one embodiment of the present invention at work.

As illustrated in FIG. 13, the present invention can be used by applying electricity to the collector[7], and the work[M], and spinning the wheel[1], while at the same time spraying electrolytic fluid[19] on the wheel. As a result, electric current flows between the conductive zones[10], and the work[M], and electrolytic grinding occurs. At the same time, the grinding zones[11] on the wheel perform mechanical grinding.

Certain factors effect the electrolytic and the mechanical grinding processes described above.

A. The speed and the accuracy of the grinding depend on the current of electricity, the width of the conductive zones and their number, the angle of the conductive zones to the shaft, the materials forming the conductive zones and other elements. By choosing and adjusting these conditions according to the material to be ground, accuracy, the condition of the work's surface, and other requirements, it is possible to get highly efficient results.

B. Conductivity and stability are required for the grinding wheel. The conductivity level will be determined by the electroresistance rate of the conductive parts such as the conductive disks, the zones and the paths.

C. In order to make the conductive zones and paths strong against wearing down, it is advised to add plenty of wear resistant substances to the materials forming them. If the conductive parts are narrow and deep, their electroresistance level will become rather high. In such cases, if the conductivity level of the connecting parts are kept high, it is possible to precisely control the conductivity level of the grinding wheel at the time of grinding by adjusting the conductivity level of the conductive parts.

D. On the other hand, if the conductivity level of the conductive parts is high or the conductive parts are wide and shallow, then the electroresistance level of the conductive parts will be low. In such cases, the conductivity level of the grinding wheel can be fully controlled by choosing and adjusting the material, the shape and the thickness of the connecting parts so that the electroresistance level of these parts becomes high.

E. If a high conductivity level is required of the grindstone, both the conductive parts and the connecting parts should have low electric resistance levels. In these cases, the conductivity level of the wheel can be controlled by adjusting the electroresistance level of both parts.

As noted above, certain factors affect the electrolytic and mechanical grinding processes. The amount of current can be from one to five amperes at a DC voltage of 2-6 volts. The conductive zones can have a circumferential width of 1.5 millimeters. The wheel can be made with any particular desired number of conductive zones. However, a preferred number is 12. As noted, the conductive zones can be offset-angled relative to the the axis of the grindstone. A preferred range of angles is from 0° to 10°. In using such a stone, a preferred electroresistance rate is from 0.5 to 10 ohms/millimeters$^2$.

As has been detailed in the preceeding pages, this invention performs both mechanical and electrolytic grinding at the same time.

Therefore, this invention combines and multiplies the merits from previous mechanical and electrolytic methods and makes it possible to grind quickly and precisely hard-to-grind materials which, using previous grinding methods, had been almost impossible to grind.

Contrary to previous electrolytic grinding, a finish grinding using the mechanical method is unnecessary even when a high degree of accuracy is required.

With this new grinding wheel, the ground surface of a work acquires the same brilliance and smoothness as that obtained by the previous mechanical method. In other words, as the grinding zones make the electrochemically eroded surface of the work smooth, the grinding wheel does not need to push the work so hard as to cause deformation of the work during or after the grinding process, contrary to previous grinding wheels.

Also, the grindstone used in this invention does not have to be a porous one, as was necessary in the previous electrolytic method. The type of grindstone used in the previous mechanical method, which is obtainable in the market, is perfectly suitable for this grinding wheel. Therefore, the grindstone is durable, hard to crack or wear down and obtainable in a blade-thin shape by using diamond dresser and other methods.

It is readily apparent that the above-described grinding wheel meets all of the objects mentioned above and also has the advantage of wide commercial utility. It should be understood that the specific forms of the invention hereinabove described are intended to be representative only, as certain modifications within the scope of these teachings will be apparent to those skilled in the art.

Accordingly, reference should be made to the following claims in determining the full scope of the invention.

What is claimed is:

1. A method of manufacturing a grinding wheel comprising:
   forming an annular grindstone of abrasive particles, said grindstone having opposed sides, a circumferential rim, and a center aperture,
   fitting an annular electroconductive tube into said aperture, and
   making a plurality of alternating electrically conductive zones and non-conductive grinding zones around the rim, said conductive zones being electrically connected to said tube.

2. The method as in claim 1, wherein the step of making comprises:
   cutting a plurality of axial grooves in said rim,
   filling said axial grooves with an electroconductive material, and
   connecting said filled axial grooves to said tube.

3. The method of claim 2, wherein the step of connecting comprises:
   cutting a plurality of radial side grooves from said tube to said axial grooves, and
   filling said radial grooves with an electroconductive material.

4. The method as in claim 2, wherein the step of connecting comprises:
   embedding a pair of annular electroconductive disks into said opposed sides, said disks extending radially from said tube to said filled axial grooves.

5. The method as in claim 2, wherein the step of connecting comprises:
   dividing the grindstone radially into two halves, and
   inserting an annular electroconductive disk between said halves extending from said tube to said axial grooves.

6. The method as in claim 1, wherein the step of making comprises:
   treating a plurality of sector-shaped zones of said grindstone to make the same electroconductive, said sector shaped zones extending to meet said tube.

7. The method as in claim 6, wherein the step of treating comprises:
   masking selected portions of said opposed sides and said rim leaving bare the desired sector shaped zones,
   placing the masked grindstone into a vacuum chamber, said grindstone dividing said chamber into two portions,
   placing an aqueous solution of said electroconductive material into one of said portions,
   drawing a vacuum in the other of said portions thereby impregnating said aqueous solution into said sector-shaped zones,
   drying the selectively impregnated grindstone, and
   stripping the masking.

8. The method as in claim 1, wherein the step of making comprises:
   treating the entire grindstone to make the same electro-conductive,
   cutting a plurality of axial grooves in said rim, and
   filling said grooves with an insulating material.

9. The method as in claim 1, wherein the step of making comprises:
   dividing said grindstone into a plurality of curved segments,
   treating said segments to make the same electroconductive,
   mounting said segments onto said tube with gaps between adjacent segments, and
   filling said gaps with insulating material.

10. The method as in claim 1, wherein the step of making comprises:
    forming a plurality of radial grooves in said grindstone from said tube to said rim, and
    filling said grooves with an electroconductive material.

11. The method as in claim 10, wherein said grooves are cut into both opposed sides.

12. The method as in claim 10, wherein said grooves are formed in a center portion between said opposed sides.

13. The method as in claim 1, wherein the step of making comprises:
    treating the entire grindstone to make the same electroconductive,
    forming a plurality of radial grooves in said grindstone from said tube to said rim, and
    filling said grooves with an insulating material.

14. The method as in claim 13, wherein said grooves are cut into both opposed sides.

15. The method as in claim 14, wherein said grooves are formed in a center portion between said opposed sides.

16. A method of manufacturing a grinding wheel comprising:
    forming a wheel of electroconductive substance having a circumferential rim and a plurality of radial teeth extending therefrom,
    forming a plurality of grindstone segments of non-electro conductive abrasive particles and curved to fit said rim, and mounting said segments onto said rim, each segment being separated from adjacent segments by one of said teeth.

17. The method as in any one of claims 1–16, wherein said abrasive particles are selected from the group consisting of green carborundum, white alundum, diamond, boron nitride, boron carbide, tunsten carbide, titanium carbide, titanium nitride, tantalum carbide, and niobium carbide.

* * * * *